United States Patent [19]

Edmondson

[11] 3,992,949

[45] Nov. 23, 1976

[54] RATE-OF-ASCENT MONITORING INSTRUMENT FOR DIVERS

[76] Inventor: Bill E. Edmondson, Rte. 1, Box 94-C, Jacksonville, Ark. 72076

[22] Filed: Dec. 29, 1975

[21] Appl. No.: 644,695

[52] U.S. Cl. .............................. 73/432 R; 58/145 R; 58/152 R

[51] Int. Cl.[2] ..................... G04B 47/06; G01F 23/14

[58] Field of Search ........................... 73/432 R, 300; 58/152 R, 152 G, 126 R, 145 R, 50 R

[56] References Cited

UNITED STATES PATENTS

| | | | |
|---|---|---|---|
| 3,111,003 | 11/1963 | Droz | 58/126 R |
| 3,188,864 | 6/1965 | Dean | 73/300 |
| 3,214,577 | 10/1965 | Protzmann | 58/50 R X |
| 3,759,101 | 9/1973 | Borom et al. | 73/432 R X |
| 3,910,117 | 10/1975 | Wicklund | 58/145 R X |

*Primary Examiner*—Richard C. Queisser
*Assistant Examiner*—Joseph W. Roskos
*Attorney, Agent, or Firm*—Ralph R. Pittman

[57] ABSTRACT

A rate-of-ascent instrument for underwater use by divers has a transparent depth gauge through which a dial of an associated timepiece is visible. The depth gauge has a generally labyrinthine capillary channel spiraling counterclockwise inwardly from the open end thereof and overlying the dial of the timepiece. As the instrument moves upwardly from a submerged position, the rate of upward movement is monitored by comparing the clockwise movement of the meniscus of the contained water column with the moving second hand of the timepiece.

8 Claims, 3 Drawing Figures

RATE-OF-ASCENT MONITORING INSTRUMENT FOR DIVERS

BACKGROUND OF THE INVENTION

It is well known that the sumbersion of a diver beyond a certain depth requires an appropriate time for decompression to permit elimination from the diver's body of a definite percentage of absorbed gases, principally nitrogen. Some prior art instruments for enabling the calculation of the proper rate of ascent of a diver include a watch and a bathometer or depth gauge, along with a chart or table for facilitating the calculations. A number of these instruments embody watches having specially marked dials, but all appear to require some manual operations or calculations to monitor a safe rise rate. Other quite differently constructed devices contain some kind of gas-permeable membranes associated with bourdon type pressures gauges, these being intended for use by divers at depths beyond the shallow submergence of sport divers, and being complex in structure and difficult to calibrate.

Existing types of capillary or manometer depth gauges are useful at the shallow depths reached by amateur divers, but capillary gauge reading follow a generally hyperbolic form of curve and are regarded as unsuitable for deeper diving. On the other hand, bourdon type gauges, if reasonably accurate at depths exceeding about 90 feet (27.42m), become progressively inaccurate at lesser depths. In recognition of this situation, certain depth gauges include both capillary and bourdon elements to obtain the desired overalll accuracy.

The previously mentioned capillary gauges usually embody a manometric channel which is arcuate or circular in configuration. With such shapes, practical considerations limit the channel length, so that a small movement of a meniscus within the channel contiguous to the closed end corresponds to such a large pressure change as to preclude availability of the depth information essential for establishing the correct rate of ascent of a submerge diver.

SUMMARY OF THE INVENTION

The instrument of the present invention embodies a new concept which enables an amateur diver to monitor and verify, from depths to 100 feet (30.48 m), a preestablished safe rate of ascent to preclude subsequent discomfort or serious physical damage by simply moving upwardly at the rate to cause the meniscus in the channel of a capillary depth gauge to move in synchronism with the subjacent second hand of an associated timepiece.

This simple procedure requires the utilization of an elongated labyrinthic capillary channel extending from an open end to preselected depth marks in a counterclockwise direction, generally in the configuration of a squarecornered inwardly turning spiral. The channel is in the form of a groove in a rectangular lower plate of transparent material, to which is suitably bonded a complementary upper plate of like material, an opening through the upper plate being disposed to provide an open end at the outermost end of the channel.

The depth gauge and the timepiece are water-tightly secured in a rectangular case, the depth gauge functioning as a clear monobloc crystal through which the dial of the timepiece is visible. The timepiece is centrally positioned with respect to the spiraling capillary channel, and the volumne of each of the several segments making up the channel is predetermined so that the depth gauge readings of zero, 30 feet (9.14m), 60 feet (18.28m) and 90 feet (27.42m) all lie along a rectilinear line defined by the 6 o'clock dial position, the midpoint of the dial and the 12 o'clock dial position.

For depth measurements below 100 feet (30.48m), the spiraling of the capillary channel is reversed, continuing in a clockwise direction in interposed spaced parallel relationship with adjacent coextensive counterclockwise directed segments of the channel. The volume of the clockwise portion of the channel is so related to the total channel volumne that submersion depths up to 300 feet (91.44m) may be indicated, and the end of this portion of the channel is closed by means of a removable closure member.

BRIEF DESCRIPTION OF THE DRAWINGS

The drawings accompanying this specification illustrate at about 2× size a convenient and practical instrument.

DESCRIPTION OF THE PREFERRED EMBODIMENT

Figure 1:
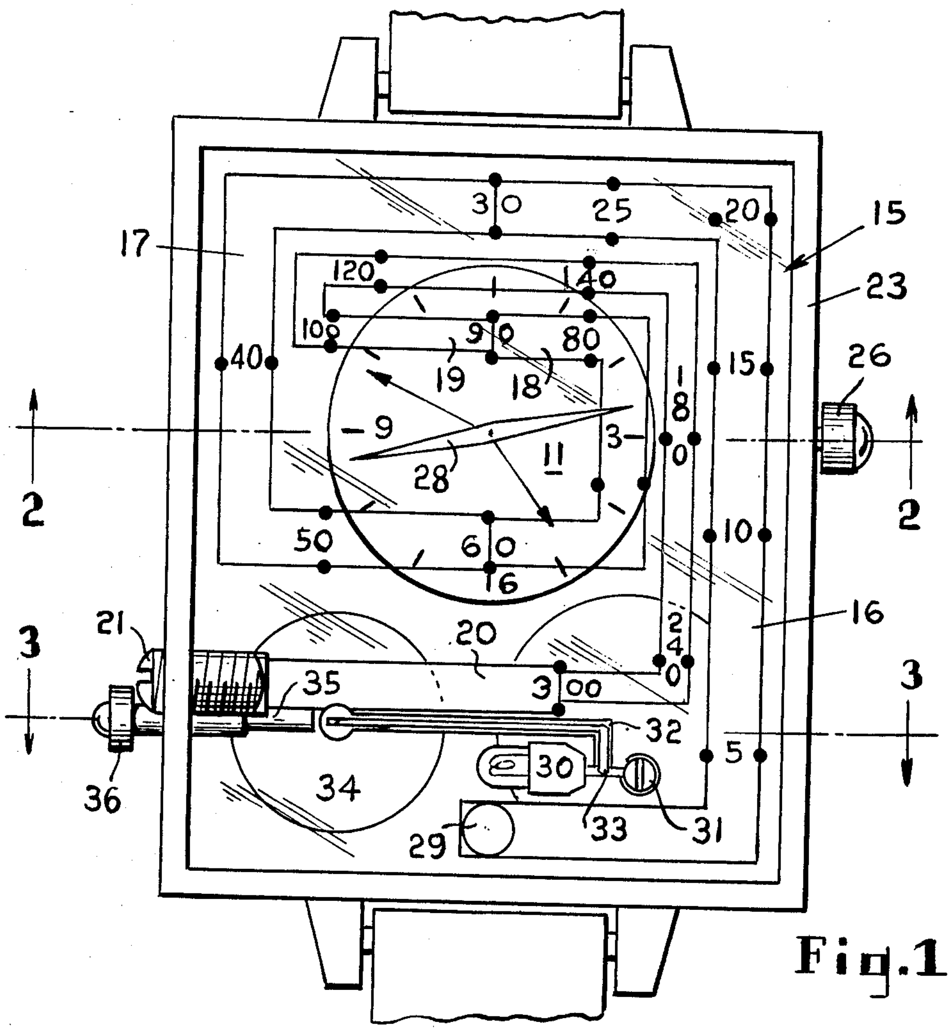
FIG. 1 is a top plan view of the invention, members of the structure disposed inwardly from the upper surface appearing as viewed through the transparent plates of the capillary channel housing.

The capillary bathometer or depth gauge 10 of the instrument is an assembly of two plates of transparent material fitted into the upstanding peripheral flange 23 of the open face metal case 22. The gauge 10 also functions as a viewing crystal for the dial of the underlying, upwardly facing timepiece 11, the latter being secured within a central circular cavity 24 in the case 22, the cavity being sealed by the threaded engagement of the closure member 25 with the inner wall of the cavity.

The depth gauge 10 includes the upper plate 14, in the shape of a rectangle identical with that of the lower plate 13, and is rigidly bonded to the latter, the faces of the joined plates being in precise registration one with the other to provide in effect a clear, transparent monobloc viewing crystal through which the dial and hands of the underlying timepiece are visible.

Figure 2:
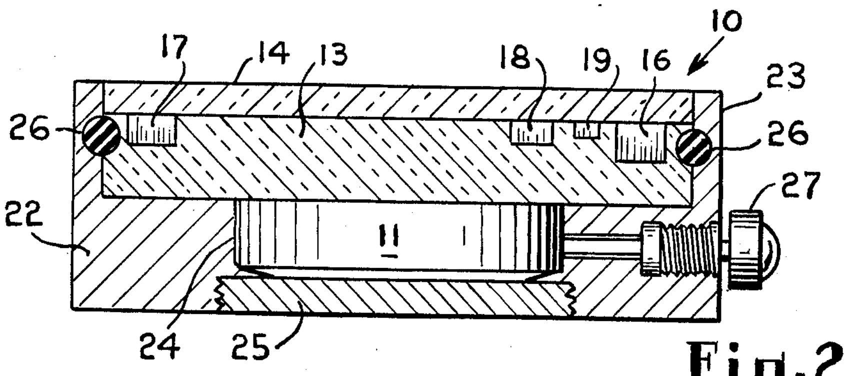
FIG. 2 is a sectional view taken along the line 2 — 2 of FIG. 1.
Figure 3:
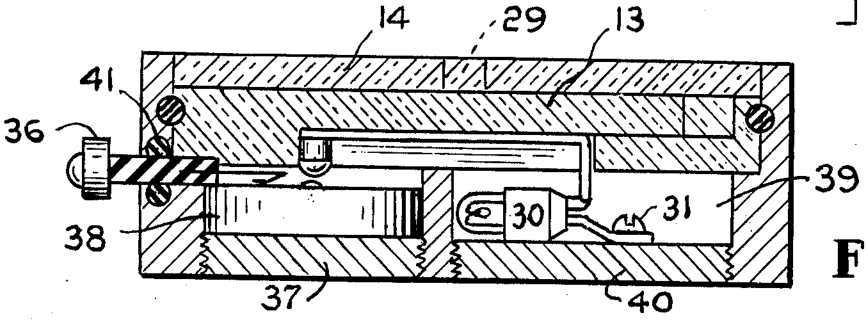
FIG. 3 is another sectional view taken along the line 3 — 3 of FIG. 1.

As shown in FIG. 2, the crystal is joined water-tightly to the case 22 by an O-ring seal 26, which is retained within facing grooves circumscribing the inner wall of the flange 23 and the outer wall of the crystal.

The knurled crown 27 is inwardly extended through a suitable packing seal for winding the timepiece, although a no-wind electrically driven timepiece may be used if desired.

The lower plate 13 of the depth gauge 10 has formed therein a groove defining the capillary channel 15 of generally labyrinthine configuration having a plurality of segments differing in cross-sectional area, each segment being made up of rectilinear sections joined by square corners. The volume of each segment is so related to the total volume of the channel that the meniscus of a water column therein will be positioned at preselected locations with respect to the dial of the timepiece upon submergence of the instrument to corresponding predetermined depths.

In more detail, the segment 16 of the capillary channel 15 extends in a counterclockwise direction from the open end 29 and along the outer margin of the inner and lower plate 13 to the 30 feet (9.14m) depth mark. The length of the segment 16 being known, a cross-sectional area is arbitrarily chosen to establish the volume of the segment. Since the volume of a gas at constant temperature varies inversely with the total pressure applied, the total pressure on the gas in the capillary gauge at a submergence of 30 feet is an increase above atmospheric of 13.4 lbs/sq. in. (942 gm./sq. cm.), a reduction of total gas volume of 47.5 percent, and a remaining gas filled portion of the capillary channel of 52.5 percent.

The percentage of the total volume of the capillary channel which is liquid filled at a depth of 30 feet being known, the total volume is also known. The remainder of the capillary channel, beyond the 30 feet depth mark, may be divided into several smaller volumes the filling of each of which corresponds to additional preselected depths, and since it is required that the length of each additional segment be such that it terminates at some specific point related to the associated clock dial, the area of the cross-section of each segment is adjusted so that the desired segment volume results from the product of the length and the cross-sectional area of each of the segments.

As illustrated in the drawing, the capillary channel segments 16, 17, 18, 19, delimited by the depth marks between the opening 29 and 30, 30 and 60, 60 and 90, and 90 and 300 respectively differ in cross-sectional area in order that each segment may indicate differing depth readings at the preselected points on the timepiece crystal containing the capillary channel. The normally continuously gas-filled terminating segment 20 of the channel is provided with the cleanout plug threaded into the lower plate 13.

The generally labyrinthine capillary channel 15, including the square-cornered counterclockwise inwardly spiraling portion of the channel, is terminated near the 100 feet (30.48m) gauge mark, merging at that location with the clockwise directed segment 19 which extends, in interposed spaced parallel relationship, between the adjacent counterclockwise directed segments 16 and 18.

The elongated channel construction of the invention enables the utilization of a much longer segment between the 100 feet (30.48m) mark and the 300 feet (91.44) mark than would be possible with the continuation of the counterclockwise configuration. The long channel segment makes possible a corresponding longer movement of the meniscus of a water column therein for each unit of depth, with accompanying greater accuracy of depth readings up to 300 feet (91.44m) than is possible with gauges with capillary tubes having a simple arcuate shape. This construction also enables the location of a channel cleanout plug 21 in a readily accessible position at the side of the case 22.

The lower and upper plates 13 and 14 respectively of the bathometer or depth gauge member are preferably made of clear polycarbonate or acrylic resin. Such materials have the ability to transmit light so that it remains invisible until it impinges upon an edge surface, commonly referred to as edge lighting or edge effect.

In the present invention, the interior surfaces of the embodied rectangular capillary channel respond to illumination as light exit edges, thereby making possible the enhancement of the visibility of the water column within the channel.

To provide a light source for edge lighting the channel, a cavity 39, extending inwardly from the lower surface of the case 22, contains the lamp 30. One conductor of the lamp circuit is connected to the metal case by the terminal 31; the other conductor 33 extends along and within an upwardly directed groove 32 to the upper contact of the switch 36, the lower contact being the positive terminal of the battery 34. The source battery is contained within the upwardly directed cavity in the case 22, and the reciprocably movable contact 35 is operated by an insulated push rod, the latter being watertightly sealed by the surrounding O-ring 41. Accessibility to the electrical components may be accomplished by removal of the threaded battery chamber closure member 37, the threaded lamp chamber closure member 40 or by lifting out the capillary gauge 10.

MODE OF OPERATION

The foregoing specification describes a rate-of-ascent monitoring instrument particularly adapted for verifying a rate of ascent of 60 feet (18.28m) per minute, either slower or faster rates being generally regarded as undesirable, especially in amateur diving. For example, if a diver wearing the herein described instrument wishes to ascend to the surface from a submergence of 90 feet (27.42m) at the prescribed rate of 60 feet (18.28) per minute, the diver begins the ascent as one end of the second hand 28 of the timepiece passes under the 90 feet (27.42m) depth mark on the gauge and proceeds to control his ascent at a rate such that the meniscus and the second hand move synchronously through an angle of 540°, corresponding to an elapsed time of 1½ minutes for the trip to the surface. Any departure from the prescribed rate of ascent, either fast or slow, is indicated by an absence of coincidence of the meniscus with the second had, thus making continuously available the information as to both the necessity and nature of correction needed, if any.

The above procedure applies to the use of the instrument at all depths from zero to 100 feet (30.48m); that is, to those depths from which an upward movement of the instrument is accompanied by a clockwise movement of the meniscus along the capillary channel toward the open end thereof.

For use at depths below about 100 feet (30.48m), the labyrinthic configuration of the channel enables the length of the path, in which the meniscus upon upward movement of the instrument moves in the counterclockwise direction even from a depth indication of 300 feet (91.44m) to an indication of 240 feet (73.12m), to be ample for a suitably accurate determination of the elapsed time for moving upwardly the 60 feet (18.28m) from one level to the other.

While the embodiment of the invention herein described is specially adpated for enabling a diver to verify by observation a rate of ascent of 60 feet (18.28m) per minute from depths to about 100 feet (30.48m), it is apparent that the time and depth data is available from the instrument to permit its use for other rates of ascent or from greater depths.

What is claimed is:

1. An underwater rate-of-ascent monitoring instrument for use by divers comprising:

a rectangular case, a timepiece having an open face dial and a second hand, and a capillary bathometer;

said timepiece and bathometer being fitted watertightly into said case, said timepiece facing upwardly and underlying said bathometer;

said bathometer comprising a crystal including upper and lower rectangular plates of transparent material rigidly joined through which the dial and secondhand of said timepiece are visible, a capillary channel defined by a groove extending along said lower plate and an aperture downwardly through the upper plate in communication with the groove at one end thereof for providing an open end to said channel;

the 6 o'clock and the 12 o'clock marks on said dial lying along a line parallel to planes defined by the longitudinal edges of said case and said aperture being interposed on said line between the 6 o'clock mark and one end of said case;

said capillary channel defining a square-cornered spiral having at least 1½ convolutions turning counterclockwise inwardly about said dial from the open end thereof; and closure means at the other end of said channel.

2. The instrument in accordance with claim 1, wherein said rectangular case has an open-face and an upwardly directed peripheral flange circumscribing said open-face, the thickness of the lower plate being greater than the thickness of the upper plate, and watertight sealing means interposed between said flange and the peripheral edge of said lower plate.

3. The instrument as claimed in claim 1, in which said closure means is removably secured at the normally closed end of the capillary channel.

4. The instrument as set forth in claim 1, in which the capillary channel is labyrinthic in configuration and the counterclockwise directed portion of the channel is serially joined to a clockwise portion of the channel, the latter portion terminating at said closure means.

5. The instrument as defined in claim 4, wherein said capillary channel comprises at least four segments each differing in cross-sectional area from any other.

6. The instrument of claim 5, wherein the cross-sectional area of each other segment of the capillary channel is successively reduced beginning with the segment into which the opening to the channel communicates.

7. The instrument of claim 1, in which the counterclockwise portion of the channel is divided into segments indicated by depth marks spaced along the channel and indicating depths of zero, 30 feet (9.14m), 60 feet (18.28m) and 90 feet (27.42m), said depth marks being also spaced longitudinally along a rectilinear line passing through the 6 o'clock and the 12 o'clock dial positions, the volume of each segment of the channel between the depth marks delineating the segments having a definite and distinct predetermined relationship to the total volume of the capillary channel.

8. The instrument as defined in claim 7, wherein said relationship is such that the pressure applied at the open end of said capillary channel in response to submergence of the instrument in water to depths of either 30 feet (9.14m), 60 feet (18.28m) or 90 feet (27.42m) brings into view columns of water within said channel terminating at the longitudinal center line of said rectangular case.

* * * * *